(12) United States Patent
Park

(10) Patent No.: US 7,357,092 B2
(45) Date of Patent: Apr. 15, 2008

(54) FLOATING COMBINED CYCLE POWER PLANT

(76) Inventor: Jae-Wook Park, 35-1003, Hanyang Apt., Apgujeong-Dong, Seoul (KR) 135-110

( * ) Notice: Subject to any disclaimer, the term of this patent is extended or adjusted under 35 U.S.C. 154(b) by 139 days.

(21) Appl. No.: 11/383,887

(22) Filed: May 17, 2006

(65) Prior Publication Data

US 2006/0260315 A1 Nov. 23, 2006

(30) Foreign Application Priority Data

May 18, 2005 (KR) ...................... 10-2005-0041495

(51) Int. Cl.
*B63B 35/44* (2006.01)
*F01K 13/02* (2006.01)
*F02B 63/04* (2006.01)
(52) U.S. Cl. .......................... 114/264; 60/665; 290/1 A
(58) Field of Classification Search ........ 114/264–269; 290/1 A; 60/665
See application file for complete search history.

(56) References Cited

U.S. PATENT DOCUMENTS 3,599,589 A * 8/1971 Busey ......................... 114/264
3,910,381 A * 10/1975 Csanady et al. ............... 184/6

FOREIGN PATENT DOCUMENTS

KR 10-2005-0036724 5/2005

* cited by examiner

*Primary Examiner*—Lars A. Olson
*Assistant Examiner*—Daniel V Venne
(74) *Attorney, Agent, or Firm*—Darby & Darby P.C.

(57) ABSTRACT

A floating combined cycle power plant includes a plurality of watertight bulkheads placed in a hull, having a structure suitable for being moved at sea, to the height of the freeboard deck; a power generating means for generating electricity, and a duct arranged to pass over the freeboard deck. The floating combined cycle power plant further includes: a fuel tank provided in the rear part of the hull and to supply the stored fuel to the power generating means; a carburetor unit provided in front of the fuel; and a loading unit provided in back of the fuel tank to receive fuel from a source and to store it in the fuel tank.

7 Claims, 5 Drawing Sheets

[Figure 1]
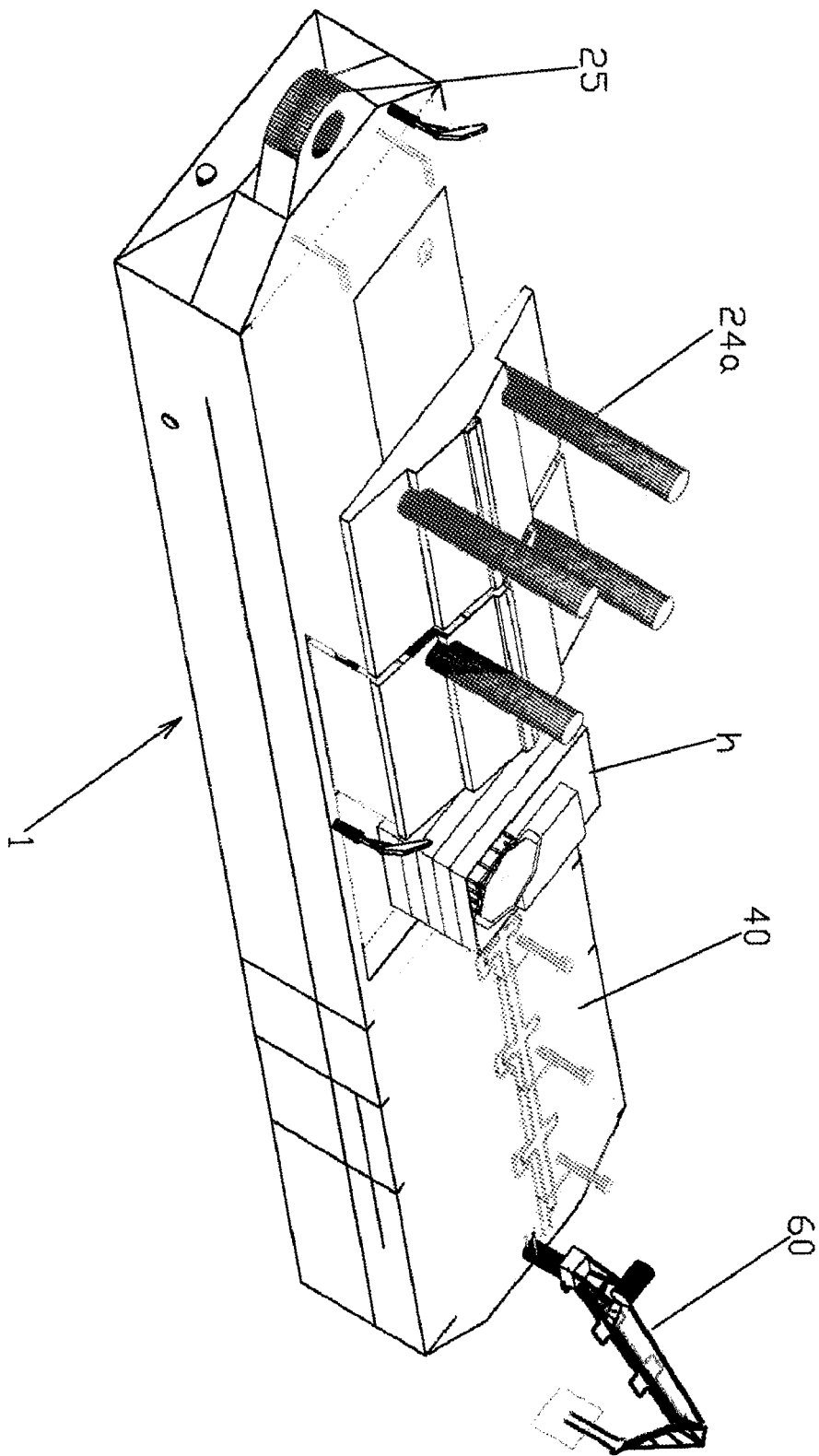

[Figure 2]
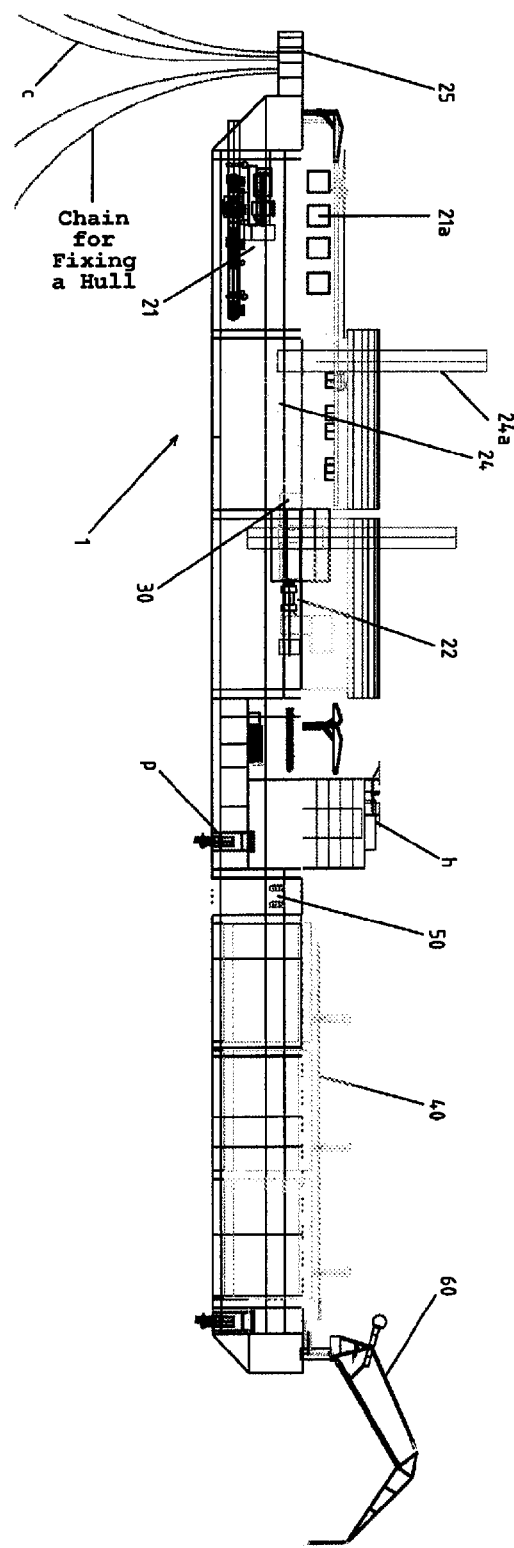

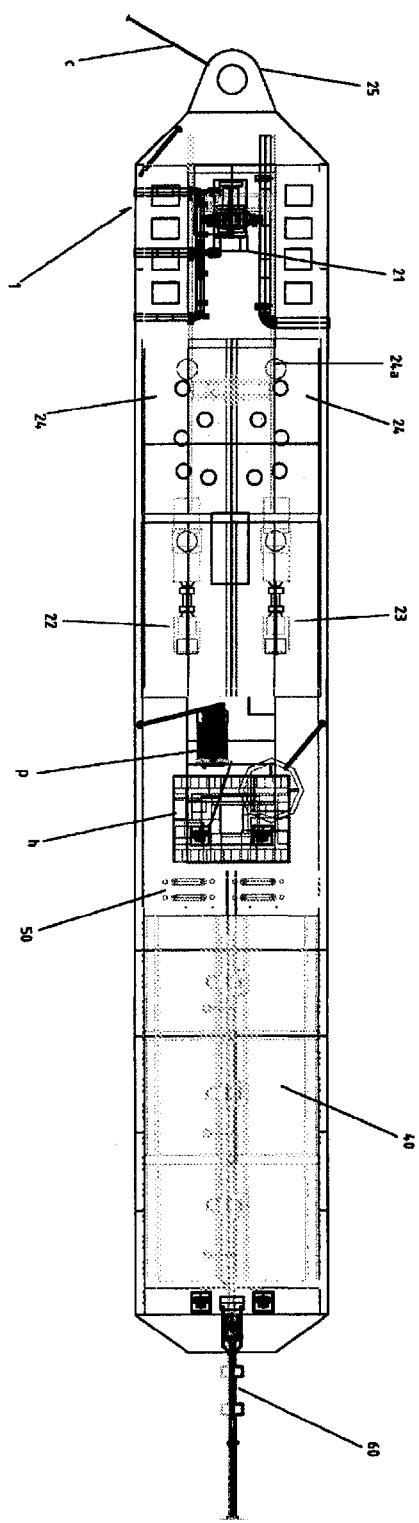
[Figure 3]

[Figure 4]
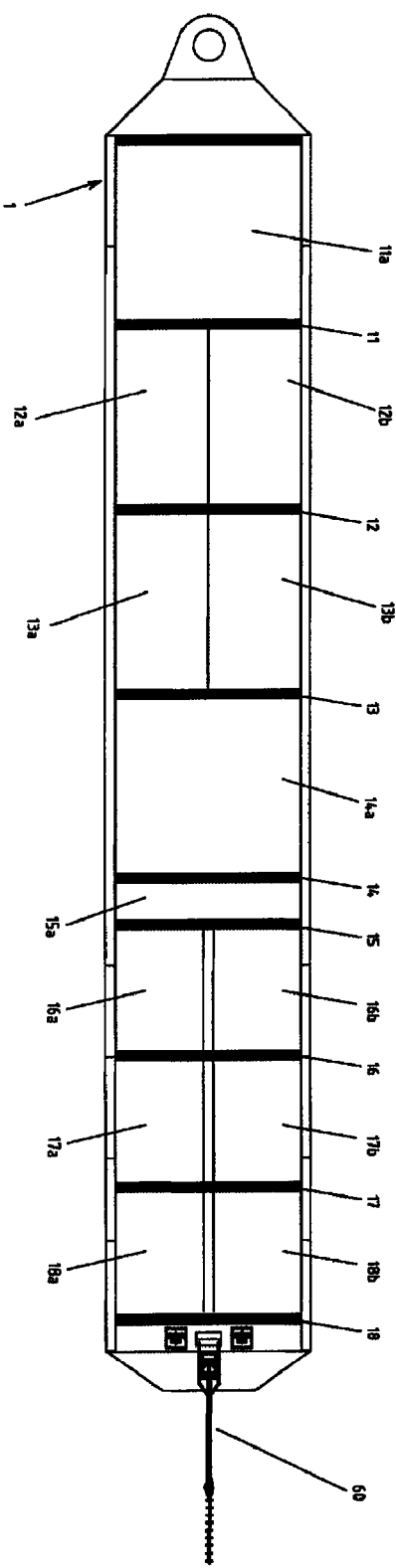

[Figure 5]
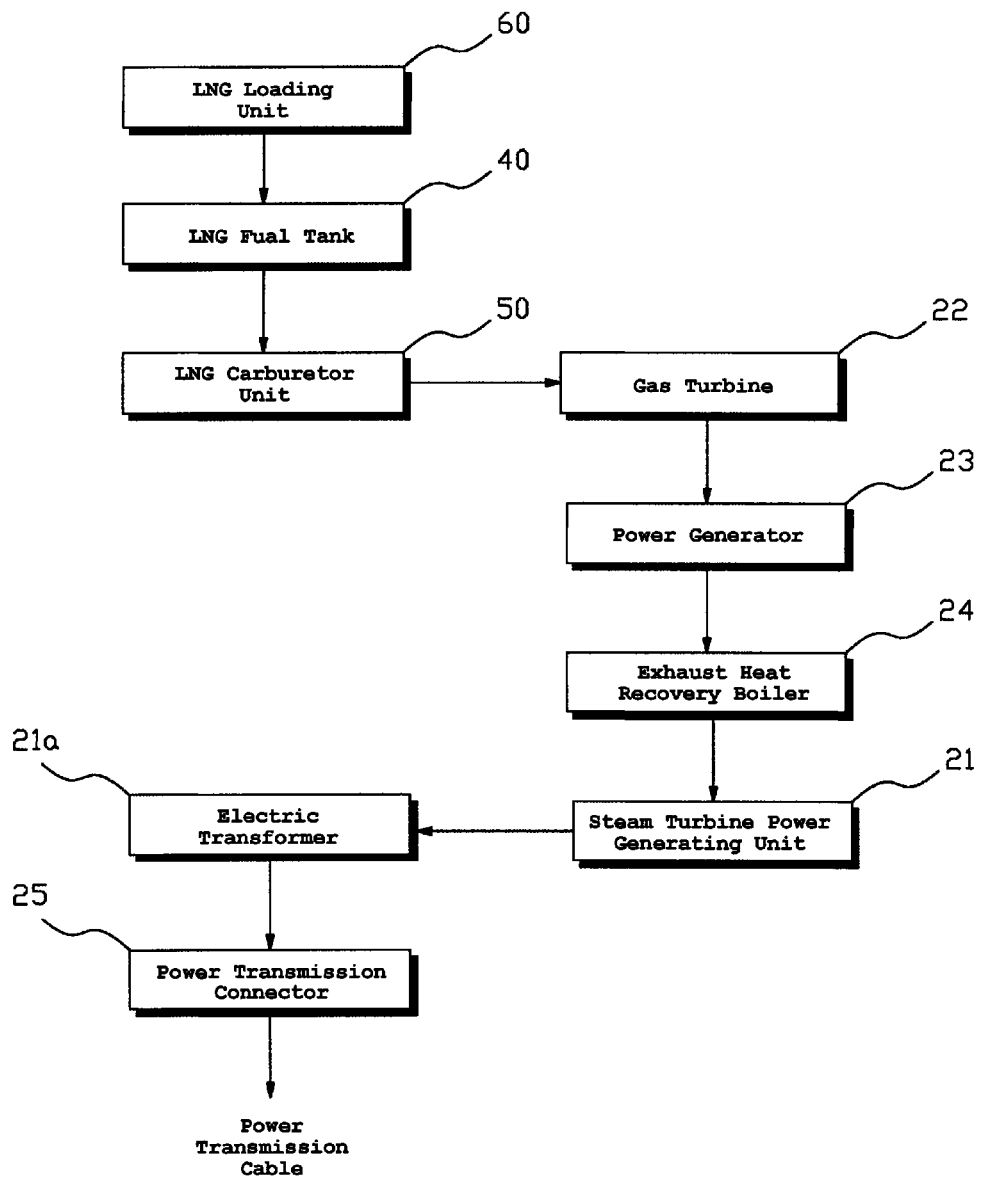

FLOATING COMBINED CYCLE POWER PLANT

BACKGROUND OF THE INVENTION

1. Field of the Invention

The present invention relates, in general, to floating combined cycle power plants and, more particularly, to a floating combined cycle power plant, which is freely movable at sea and does not require separate flumes for water or adjacent piers, but can efficiently use liquefied natural gas, which is clean fuel.

2. Description of the Related Art

Generally, power plants comprise equipment for converting thermal energy or mechanical energy into electrical energy, rotate a turbine using an energy source, such as water, oil, coal, natural gas, or nuclear power, and generate electricity using a power generator connected to the turbine. Such power plants have typically been classified into water power plants, steam power plants, nuclear power plants, etc. according both to the kind of energy source used in the power plants and to the power generation method.

Furthermore, tidal power plants, using tidal energy, wind power plants, using wind energy, geothermal power plants, using subterranean heat energy, solar power plants, using solar energy, and magneto-hydrodynamic (MHD) power plants, using magneto-hydrodynamic energy, have been actively studied in recent years for practical use thereof as power plants in the future.

However, the above-mentioned power plants are problematic in that it is very difficult to locate the power plant facilities in desirable locations, and the power plants impose a large initial investment on the owners.

For example, in the Korean Peninsula, having three sides surrounded by the sea, most power plants are built at the seaside because the generating fuel, which is coal, petroleum, or liquefied natural gas, which is imported from abroad, can be easily transported, so that the charges for transporting the fuel can be reduced and, furthermore, the large quantity of water that is required to operate the power plants can be easily obtained from the sea.

Furthermore, the locations of the power plants have been determined in consideration of environmental impact assessments, the possibility of disasters based on the geological characteristics of selected districts, the expected impacts of accidents on neighboring industrial facilities or explosive material storage facilities, the supply of fuel and water required to operate the power plants, and the expected power consumption by power consumers using electricity supplied by the power plants.

In recent years, power plants have become recognized as harmful facilities, so it is necessary to pay careful attention to trends of public opinion of local inhabitants or of non-governmental organizations (NGOs), in addition to the conditions at locations. Thus, the determination of the locations of the power plants may be accompanied by further practical limitations.

Furthermore, in the case of a specific district, where a great quantity of electricity must be temporarily used, or of a district under development, which requires a great quantity of electricity, it is necessary to build a new power plant at the district to meet the electricity requirements of the district because there is no alternative plan. However, the installation of a new power plant in such a district must be accompanied by a large investment and takes a lot of time. Furthermore, if the amount of electric power consumption is remarkably reduced, or if the facilities that use the electricity are removed, so that the use of electricity is discontinued, the power plant built in the specific district suffers from economic inefficiency. In an effort to solve the problem, electricity may be supplied to the specific district by extending the existing electric power supply network. However, the extension of the power supply network limits the quantity of electricity that can be supplied to the district.

In an effort to overcome the above-mentioned problems, the inventor of the present invention proposed a floating power plant configured to be freely movable at sea in Korean Patent Appln. No. 2005-36724.

In the floating power plant, proposed by the inventor of the present invention, a plurality of power generating facilities for generating electricity is appropriately and separately installed in watertight chambers defined in a hull having a shape similar to the hull of a conventional ship and is organically interconnected, so that the floating power plant is freely movable at sea.

The floating power plant proposed by the inventor of the present invention uses liquefied fossil fuel, such as crude petroleum oil (Bunker C oil) or Orimulsion, for generating electricity, so that the floating power plant causes environmental pollution due to the use of fossil fuel. Thus, environmental pollution prevention equipment is required to be provided in the floating power plant.

Described in detail, the floating power plant using crude petroleum oil as fuel must be provided with both a denitrification unit and a desulphurization unit for reducing the quantities of nitrogen oxides and sulfur oxides, respectively, generated during the combustion of fossil fuel. The power plant also has a plurality of additional facilities to store and handle byproducts produced by both the denitrification unit and the desulphurization unit. The sizes of the facilities to store and handle the byproducts cannot be reduced due to the intrinsic functions thereof.

The additional facilities, which include the denitrification unit, the desulphurization unit and other facilities to store and handle byproducts produced by the units, but are not concerned with the power generating function of the power plant, occupy substantial space in the floating power plant. Therefore, to increase the electricity generation capacity of the floating power plant, the size of the hull must be increased.

SUMMARY OF THE INVENTION

Accordingly, the present invention has been made keeping in mind the above problems occurring in the related art, and an object of the present invention is to provide a floating combined cycle power plant, which efficiently uses liquefied natural gas (LNG), which is clean fuel, so that the proportion of space occupied by the power generating facilities in a hull having limited space can be increased while the advantages expected from the conventional floating power plant proposed by the inventor of the present invention can be maintained and, therefore, a higher power generation capacity can be realized although the hull of the floating combined cycle power plant has the same size as that of the conventional floating power plant.

Another object of the present invention is to provide a floating combined cycle power plant, which can minimize environmental pollution caused by pollutants generated from a power generation process thereof.

In order to achieve the above objects, according to a preferred embodiment of the present invention, there is provided a floating combined cycle power plant, comprising: a plurality of watertight bulkheads placed in a hull, having a structure suitable for being moved at sea, to the height of a freeboard deck, thus partitioning the interior of the hull into a plurality of watertight chambers; a power generating means for generating electricity, comprising a plurality of parts separately installed in the watertight chambers defined by the watertight bulkheads in the hull; and a duct arranged to pass over the freeboard deck to interconnect the parts of the power generating means installed in the watertight chambers, the floating combined cycle power plant further comprising: a fuel tank provided in the rear part of the hull to store liquefied natural gas (LNG) therein and to supply the stored LNG to the power generating means; a carburetor unit provided at a predetermined position in front of the fuel tank to vaporize the LNG supplied from the fuel tank; and a loading unit provided at a predetermined position in back of the fuel tank to receive LNG from an LNG source and to store the LNG in the fuel tank.

In one aspect of the present invention, the fuel tank may be divided into a plurality of fuel tanks, which are arranged in two rows.

In another aspect of the present invention, the watertight bulkheads may comprise: a first bulkhead transversely placed in the bow of the hull to define a first watertight chamber in which a steam turbine power generating unit is installed; a second bulkhead longitudinally and transversely placed in back of the first bulkhead to define second and third watertight chambers in which an exhaust heat recovering boiler and a chimney are installed; a third bulkhead placed in back of the second bulkhead to define fourth and fifth watertight chambers in which a gas turbine and a generator are installed; a fourth bulkhead placed in back of the third bulkhead to define a sixth watertight chamber in which an engine and subsidiary facilities are installed; a fifth bulkhead placed in back of the fourth bulkhead to define a seventh watertight chamber in which the liquefied gas carburetor unit is installed; and sixth, seventh and eighth bulkheads sequentially placed in back of the fifth bulkhead to define eighth, ninth, tenth, eleventh, twelfth and thirteenth watertight chambers in which six fuel tanks are installed in two rows.

In a further aspect of the present invention, the power generating means may comprise a steam turbine power generating unit, a plurality of gas turbines, and a plurality of power generators.

In still another aspect of the present invention, the steam turbine power generating unit may be connected to an inlet pipe at a first end thereof to draw sea water therein through the inlet pipe using an axial flow pump, and is connected to an outlet pipe at a second end thereof to discharge sea water outside the hull, wherein the inlet pipe and the outlet pipe are placed together at either the starboard or larboard side, opposite the watertight chamber having the steam turbine power generating unit therein.

In yet another aspect of the present invention, the power generating means may comprise a power transmission connector, which is provided at the bow of the hull to be detachably connected to a submarine power transmission cable to transmit electricity from the power generating means.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a perspective view illustrating the appearance of a floating combined cycle power plant according to the present invention;

FIGS. 2 and 3 are, respectively, a plan view and a side view illustrating the internal construction of the floating combined cycle power plant according to the present invention;

FIG. 4 is a plan view illustrating the construction of watertight chambers provided in the floating combined cycle power plant according to the present invention; and FIG. 5 is a block diagram illustrating the construction of a power generating means provided in the floating combined cycle power plant according to the present invention.

DETAILED DESCRIPTION OF THE INVENTION

Reference will now be made in greater detail to a preferred embodiment of the present invention, an example of which is illustrated in the accompanying drawings. Wherever possible, the same reference numerals will be used throughout the drawings and the description to refer to the same or like parts.

Herein below, a floating combined cycle power plant according to a preferred embodiment of the present invention will be described with reference to the accompany drawings.

FIG. 1 is a perspective view illustrating the appearance of a floating combined cycle power plant according to the present invention. FIGS. 2 and 3 are, respectively, a plan view and a side view illustrating the internal construction of the floating combined cycle power plant according to the present invention.

FIG. 4 is a plan view illustrating the construction of watertight chambers provided in the floating combined cycle power plant according to the present invention. FIG. 5 is a block diagram illustrating the construction of a power generating means provided in the floating combined cycle power plant according to the present invention.

As shown in the drawings, the floating combined cycle power plant according to the preferred embodiment of the present invention comprises a hull 1 having a structure suitable for being moved at sea. A plurality of watertight bulkheads 10 is placed in the hull 1 to partition the interior of the hull 1 into a plurality of watertight chambers having respective spaces. A power generating means 20, which generates electricity, is installed in the hull 1 such that the parts of the power generating means 20 are separately installed in the watertight chambers defined by the watertight bulkheads 10 in the hull 1. A duct 30 is provided to interconnect and integrate the parts of the power generating means 20. The floating combined cycle power plant further includes a fuel tank 40, which is provided in the hull to store therein liquefied natural gas (LNG), supplied from an external fuel supply source using a loading unit 60, and to supply the stored LNG to the power generating means 20.

The hull 1 has a watertight structure, so that the hull 1 can be prevented from being submerged even if it is subjected to an impact due to a collision or it is unexpectedly damaged. In the hull 1, a keel longitudinally extends from the stem to the sternpost and is combined with a plurality of ribs, thus forming the framework of the hull. The framework of the hull 1 is also combined with shells and decks, so that the framework of the hull can be supported in longitudinal and latitudinal directions.

In the present invention, the hull 1 provides a plurality of spaces for efficiently and separately carrying the parts of the power generating means 20 therein. Furthermore, the hull 1 is provided with an engine p and lodging facilities h therein. The sizes and shapes of both the engine p and the lodging facilities h may be appropriately designed according to the deadweight tonnage of the hull and the number of persons residing thereon. The engine and the lodging facilities provided in the hull may be realized according to conventional techniques, and further explanation is thus not deemed necessary.

The watertight bulkheads 10 are placed in the hull 1 at predetermined positions, so that the interior of the hull is partitioned into a plurality of watertight chambers to separately carry the parts of the power generating means.

The watertight bulkheads 10 divide the interior of the hull 1 into the watertight chambers, so that the parts of the power generating means 20 can be separately installed in the chambers in such a way that the power generating means 20 is efficiently prevented from sinking. The watertight bulkheads are shaped from steel sheets and are integrated with the hull 1 through welding. In the preferred embodiment of the present invention, the watertight bulkheads are placed in the interior of the hull to the height of the freeboard deck.

The watertight bulkheads 10 comprise a plurality of longitudinal bulkheads and a plurality of latitudinal bulkheads, which are longitudinally or transversely placed in the hull 1 as will be described in detail later herein.

A first bulkhead 11 is transversely placed at the bow of the hull 1 to define a first watertight chamber 11a in which a steam turbine power generating unit 21 is installed.

A second bulkhead 12 is transversely placed in back of the first bulkhead 11 at a position spaced apart from the first bulkhead 11 by a predetermined distance, with a subsidiary longitudinal bulkhead longitudinally placed between the first bulkhead 11 and the second bulkhead 12 in the hull 1, thus defining second and third watertight chambers 12a and 12b between the first bulkhead 11 and the second bulkhead 12. Both an exhaust heat recovery boiler 24 and a chimney 24a are installed in each of the second and third watertight chambers 12a and 12b.

A third bulkhead 13 is transversely placed in back of the second bulkhead 12 at a position spaced apart from the second bulkhead 12 by a predetermined distance, with a subsidiary longitudinal bulkhead longitudinally placed between the second bulkhead 12 and the third bulkhead 13 in the hull 1, thus defining fourth and fifth watertight chambers 13a and 13b. The fourth and fifth watertight chambers 13a and 13b are arranged side by side in the transverse direction of the hull 1, with a gas turbine 22 and a power generator 23 installed in the fourth and fifth watertight chamber 13a and 13b, respectively.

A fourth bulkhead 14 is transversely placed in back of the third bulkhead 13 at a position spaced apart from the third bulkhead 13 by a predetermined distance, thus defining a sixth watertight chamber 14a in the hull 1. The engine p and subsidiary facilities are installed in the sixth watertight chamber 14a.

A fifth bulkhead 15 is placed in back of the fourth bulkhead 14 at a position spaced apart from the fourth bulkhead 14 by a predetermined distance, thus defining a seventh watertight chamber 15a, with a liquefied gas carburetor unit 50 installed in the seventh watertight chamber 15a.

Furthermore, the fuel tank 40 is installed in back of the fifth bulkhead 15. The fuel tank 40 may be realized as a single tank or as a multitude of up to ten tanks, according to the size of the hull 1 and/or the desired capacity of the power generating means. The shape and size of the fuel tanks may be appropriately changed according to the size of the hull and/or the desired capacity of the power generating means. In the preferred embodiment of the present invention, to install the fuel tank 40 in the hull 1, sixth, seventh and eighth bulkheads 16, 17 and 18 are sequentially placed in back of the fifth bulkhead 15 at positions spaced apart from each other by predetermined distances, with subsidiary longitudinal bulkheads placed between the centers of the sixth, seventh and eighth bulkheads 16, 17 and 18, thus defining eighth, ninth, tenth, eleventh, twelfth and thirteenth watertight chambers 16a, 16b, 17a, 17b, 18a and 18b in which multiple fuel tanks 40 are installed.

The construction of the above-mentioned watertight bulkheads 10 may be appropriately changed without affecting the functioning of the present invention according to the desired capacity, size and shape of the power generating means installed in the watertight chambers, as long as the bulkheads have a watertight structure.

The power generating means 20 for generating electricity comprises a plurality of parts, which are separately installed in the watertight chambers. Described in detail, the power generating means 20 comprises the steam turbine power generating unit 21, the exhaust heat recovery boiler 24, the chimney 24a, the gas turbine 22, the power generator 23, the fuel tank 40, the liquefied gas carburetor unit 50, and the loading unit 60.

The steam turbine power generating unit 21 is installed in the first watertight chamber 11a. An inlet pipe is connected to a first end of the power generating unit 21, so that sea water can be drawn into the power generating unit 21 through the inlet pipe using the pumping force of an axial flow pump (not shown). An outlet pipe is connected to a second end of the power generating unit 21 and discharges sea water outside the hull 1. In the present invention, the inlet pipe and the outlet pipe are preferably placed together at either the starboard or larboard side, opposite the watertight chamber having the power generating unit 21 therein. The steam turbine power generating unit 21 receives high pressure steam or middle pressure steam from the boiler 24 and generates rotating force to actuate the power generator 23, thus causing the power generator 23 to generate electricity.

The exhaust heat recovery boiler 24 may comprise a single boiler or multiple boilers according to the number of gas turbines 22 and power generators 23. The boiler 24 may comprise a single boiler or multiple boilers according to the desired capacity of the power generating unit 21. The boiler 24 is installed in each of the second and third watertight chambers 12a and 12b and continuously generates steam. The steam produced by the boiler 24 can be supplied to the steam turbine power generating unit 21 and/or to the other subsidiary facilities requiring steam.

The exhaust heat recovery boiler 24 is a machine that includes a heat recovery steam generator. The heat recovery steam generator of the exhaust heat recovery boiler 24 is a facility to operate the steam turbine power generating unit 21 using exhaust gas heat of the gas turbine 22, and is realized as a heat exchanger comprising fins and tubes. In the operation of the heat recovery steam generator, exhaust gas flowing from an exhaust duct of the gas turbine 22 passes through the fins and tubes of the heat recovery steam generator and heats water or steam flowing in the tubes, thus vaporizing water or making superheated steam. The heat recovery steam generator uses exhaust gas heat of the gas turbine 22, which uses liquefied natural gas (LNG), and may be realized as a triple pressure heat recovery steam generator or a natural circulation heat recovery steam generator. The exhaust heat recovery boiler 24 having the heat recovery steam generator is well known to those skilled in the art, and further explanation is thus not deemed necessary. However, it should be understood that, because the boiler 24 of the present invention is used at sea, the boiler 24 is preferably designed as a marine boiler, which has a self-correcting function compensating for the rolling and pitching of the hull 1.

The chimney 24a is provided in each of the second and third watertight chambers 12a and 12b such that it communicates with the boiler 24.

The gas turbine 22 and the power generator 23 are, respectively, installed in the fourth and fifth watertight chambers 13a and 13b defined side by side between the second and third bulkheads 12 and 13. The gas turbine 22 uses burnt gas, which has been generated from a burner, as a working fluid. In the burner, combustible gas, prepared in the carburetor unit by mixing vaporized fuel with pressurized air supplied from an air compressor, is burnt to generate burnt gas. The gas turbine generates a rotating force using the burnt gas and transmits it to the power generator 23. The gas turbine 22 comprises a turbine shaft and the burner, and further includes some sub-units, such as an air suction unit, an exhaust unit, and other subsidiary units.

The power generator 23 is operated using a rotating force and generates electricity. The voltage of the electricity is increased by an electrical transformer 21a, which constitutes the power generating unit 21 installed in the first watertight chamber 11a. The boosted electricity is, thereafter, transmitted to a power transmission connector 25. In the present invention, the power transmission connector 25 is provided in the bow of the hull 1 such that the connector 25 can be detachably connected to a submarine power transmission cable c, so that the electricity can be transmitted to facilities requiring electricity.

In back of the fourth and fifth watertight chambers 13a and 13b having the gas turbine 22 and the power generator 23, the lodging facilities h and the engine p are provided at upper and lower positions. The fuel tank 40 and the loading unit 60 are installed in back of the lodging facilities h.

The fuel tank 40 is installed in the stern of the hull 1 and supplies liquefied natural gas (LNG) to the power generating means 20. In the preferred embodiment of the present invention, the fuel tank 40 comprises six separate tanks arranged in two rows. The loading unit 60 is installed in the stern of the hull 1 at a position in back of the fuel tanks 40. The loading unit 60 receives LNG from an LNG tanker and supplies LNG to the fuel tanks 40. The fuel tanks 40 and the loading unit 60 may be appropriately designed according to the desired capacity of the power generating means 20 and the size of the hull 1. Furthermore, the fuel tanks 40 and the loading unit 60 may be easily realized according to conventional techniques, and further explanation is thus not deemed necessary.

Furthermore, a ballast tank may be provided in the surplus space outside the watertight chambers, so that a predetermined quantity of sea water or other heavy material can be stored in the ballast tank to impart desired draft and stability to the hull 1. The ballast tank can be realized according to conventional techniques and, therefore, further explanation is not deemed necessary.

During the operation of the floating combined cycle power plant, the gas turbine 22 of the power generating means 20 generates combustible gas. The combustible gas from the gas turbine 22 subsequently operates the power generator 23, thus causing the power generator 23 to produce electricity. Furthermore, steam produced by the exhaust heat recovery boiler 24 operates the steam turbine. The voltage of electricity is increased by the electrical transformer and is transmitted to the submarine power transmission cable c through the power transmission connector 25.

The duct 30 is a pipe, which passes over the freeboard deck and interconnects and integrates the gas turbine 22 and the exhaust heat recovery boiler 24. The duct 30 is preferably provided with a directional control blade (not shown) therein to efficiently control the flow rate and flow direction of exhaust gases. The directional control blade (not shown) can be realized according to conventional techniques, so that further explanation is not deemed necessary.

The duct 30 is placed above the freeboard deck, so that, even if part of the hull 1 is unexpectedly broken, the duct 30 is not submerged.

As described above, in the floating combined cycle power plant according to the present invention, the interior of the hull 1 is partitioned into the watertight chambers by the watertight bulkheads 10, with the parts of the power generating means 20 being separately installed in the respective watertight chambers and being interconnected and integrated by the duct 30. The floating combined cycle power plant is operated as follows.

The hull of the floating combined cycle power plant is freely movable at sea, so that the power plant is not limited with respect to place. Particularly, the floating combined cycle power plant can directly take LNG, which is fuel for power generation, from a fuel tanker. Thus, the floating combined cycle power plant does not require any separate LNG storage facility. Furthermore, it can be moved to any district having facilities requiring electricity or can generate electricity on the open sea.

When both the gas turbine 22 and the exhaust heat recovery boiler 24 are operated to produce steam, the steam sequentially operates the steam turbine and the power generator 23, thus causing the power generator 23 to produce electricity. The voltage of electricity is increased by the electrical transformer, and the boosted electricity is transmitted to the power transmission connector 25. Because the power transmission connector 25 is detachably connected to a submarine power transmission cable c, the electricity can be transmitted to facilities requiring electricity.

As apparent from the above description, the floating combined cycle power plant according to the present invention provides advantages in that, because the power plant is configured to be freely movable at sea, it can economically supply electricity to a specific district or to a specific facility that temporarily requires electricity, or can be used as an emergency electric power source. The floating combined cycle power plant remarkably increases freedom to form and manage an energy policy.

Particularly, the floating combined cycle power plant according to the present invention uses liquefied natural gas (LNG), so that the power plant does not cause environmental pollution due to sulfur oxides and, thereby, solves the environmental pollution problems experienced with conventional power plants.

Furthermore, in comparison with a conventional floating power plant using liquefied fossil fuel, the floating combined cycle power plant according to the present invention remarkably reduces the surface area occupied by facilities having no relation to the power generation function. Thus, the proportion of space occupied by the power generating facilities in a hull can be increased and, therefore, a higher power generation capacity can be realized even though the hull of the floating combined cycle power plant has the same size as that of the conventional floating power plant.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A floating combined cycle power plant, comprising: a plurality of watertight bulkheads placed in a hull, having a structure suitable for being moved at sea, to a height of a freeboard deck, thus partitioning an interior of the hull into a plurality of watertight chambers; power generating means for generating electricity, comprising a plurality of parts separately installed in the watertight chambers defined by the watertight bulkheads in the hull; and a duct arranged to pass over the freeboard deck to interconnect the parts of the power generating means installed in the watertight chambers, the floating combined cycle power plant further comprising:
   a fuel tank provided in a rear part of the hull to store liquefied natural gas (LNG) therein and to supply the stored LNG to the power generating means;
   a carburetor unit provided at a predetermined position in front of the fuel tank to vaporize the LNG supplied from the fuel tank; and
   a loading unit provided at a predetermined position in back of the fuel tank to receive LNG from an LNG source and to store the LNG in the fuel tank.

2. The floating combined cycle power plant according to claim 1, wherein the fuel thank is divided into a plurality of fuel tanks, which are arranged in two rows.

3. The floating combined cycle power plant according to claim 1, wherein the watertight bulkheads comprise:
   a first bulkhead transversely placed in a bow of the hull to define a first watertight chamber in which a steam turbine power generating unit is installed;
   a second bulkhead longitudinally and transversely placed in back of the first bulkhead to define second and third watertight chambers in which an exhaust heat recovering boiler and a chimney are installed;
   a third bulkhead placed in back of the second bulkhead to define fourth and fifth watertight chambers in which a gas turbine and a generator are installed;
   a fourth bulkhead placed in back of the third bulkhead to define a sixth watertight chamber in which an engine and subsidiary facilities are installed;
   a fifth bulkhead placed in back of the fourth bulkhead to define a seventh watertight chamber in which a liquefied gas carburetor unit is installed; and
   sixth, seventh and eighth bulkheads sequentially placed in back of the fifth bulkhead to define eighth, ninth, tenth, eleventh, twelfth and thirteenth watertight chambers in which six fuel tanks are installed in two rows.

4. The floating combined cycle power plant according to claim 1, wherein the power generating means comprises a steam turbine power generating unit, a plurality of gas turbines, and a plurality of power generators.

5. The floating combined cycle power plant according to claim 1, wherein the steam turbine power generating unit is connected to an inlet pipe at a first end thereof to draw sea water therein through the inlet pipe using an axial flow pump, and is connected to an outlet pipe at a second end thereof to discharge sea water outside the hull, wherein the inlet pipe and the outlet pipe are placed together at either a starboard or larboard side, opposite the watertight chamber having the steam turbine power generating unit therein.

6. The floating combined cycle power plant according to claim 1, wherein the power generating means comprises a power transmission connector, which is provided at a bow of the hull to be detachably connected to a submarine power transmission cable to transmit electricity from the power generating means.

7. The floating combined cycle power plant according to claim 3, wherein the steam turbine power generating unit is connected to an inlet pipe at a first end thereof to draw sea water therein through the inlet pipe using an axial flow pump, and is connected to an outlet pipe at a second end thereof to discharge sea water outside the hull, wherein the inlet pipe and the outlet pipe are placed together at either a starboard or larboard side, opposite the watertight chamber having the steam turbine power generating unit therein.

* * * * *

UNITED STATES PATENT AND TRADEMARK OFFICE
CERTIFICATE OF CORRECTION

| | |
|---|---|
| PATENT NO. | : 7,357,092 B2 |
| APPLICATION NO. | : 11/383887 |
| DATED | : April 15, 2008 |
| INVENTOR(S) | : Jae-Wook Park |

Page 1 of 1

It is certified that error appears in the above-identified patent and that said Letters Patent is hereby corrected as shown below:

Title Page, Insert:

--(73) Assignee: Mi-Yeong Kim, Seoul (KR)--.

Signed and Sealed this
Twelfth Day of June, 2012

David J. Kappos
*Director of the United States Patent and Trademark Office*